(12) United States Patent
Greenhoe

(10) Patent No.: US 6,962,039 B2
(45) Date of Patent: Nov. 8, 2005

(54) LAWN STRIPING ASSEMBLY

(76) Inventor: Robert Greenhoe, 11833 Schavery Rd., DeWitt, MI (US) 48220

( * ) Notice: Subject to any disclaimer, the term of this patent is extended or adjusted under 35 U.S.C. 154(b) by 130 days.

(21) Appl. No.: 10/818,573

(22) Filed: Apr. 6, 2004

(65) Prior Publication Data

US 2004/0182056 A1 Sep. 23, 2004

Related U.S. Application Data

(63) Continuation-in-part of application No. 10/385,093, filed on Mar. 10, 2003, now abandoned.
(60) Provisional application No. 60/363,120, filed on Mar. 11, 2002.

(51) Int. Cl.[7] .......................... A01D 34/03; A01D 34/64
(52) U.S. Cl. ......................................... 56/16.7; 56/17.4
(58) Field of Search ............................... 56/16.7, 17.2, 56/17.4, 249, 294; 411/84, 85, 104; 248/73, 219.1, 220.31, 243

(56) References Cited

U.S. PATENT DOCUMENTS

| | | | | | |
|---|---|---|---|---|---|
| 2,032,784 | A | * | 3/1936 | Worthington | 56/7 |
| 2,528,116 | A | * | 10/1950 | Clemson | 56/249 |
| 2,660,018 | A | * | 11/1953 | Clemson | 56/249 |
| 3,106,812 | A | * | 10/1963 | McDonagh | 56/320.1 |
| 3,402,535 | A | * | 9/1968 | Nelson | 56/320.1 |
| 3,537,720 | A | * | 11/1970 | Irgens | 280/43 |
| 3,754,385 | A | * | 8/1973 | Hoffmeyer | 56/17.2 |
| 4,221,443 | A | * | 9/1980 | Heaney | 312/306 |
| 4,481,757 | A | * | 11/1984 | Tsuchiya | 56/16.9 |
| 4,638,622 | A | * | 1/1987 | Smith | 56/17.4 |
| 5,553,380 | A | * | 9/1996 | Rice | 29/895.2 |
| 5,870,888 | A | * | 2/1999 | Pugh | 56/16.7 |
| 6,047,530 | A | * | 4/2000 | Bednar | 56/6 |
| 6,523,335 | B2 | * | 2/2003 | Vanderipe | 56/16.7 |
| 6,588,711 | B2 | * | 7/2003 | Onishi | 248/49 |

FOREIGN PATENT DOCUMENTS

GB        2126966 A  *  4/1984    .......... B62D/53/08

* cited by examiner

*Primary Examiner*—Arpan Fabian Kovacs
(74) *Attorney, Agent, or Firm*—Howard & Howard

(57) ABSTRACT

The lawn striping assembly (10, 110) utilizes a C-shaped channel member having a plurality of attachment positions (22, 122). A pair of brackets (46) attach a roller apparatus (16) to the frame (302) of a lawn mower (114). The C-shaped channel member includes a top portion (20, 120) presenting a plurality of attachment positions (22, 122) for retaining a fastener (42, 142, 242) therein. In a more specific sense, the invention utilizes a pair of said C-shaped channel members disposed in back to back relationship with one another.

24 Claims, 4 Drawing Sheets

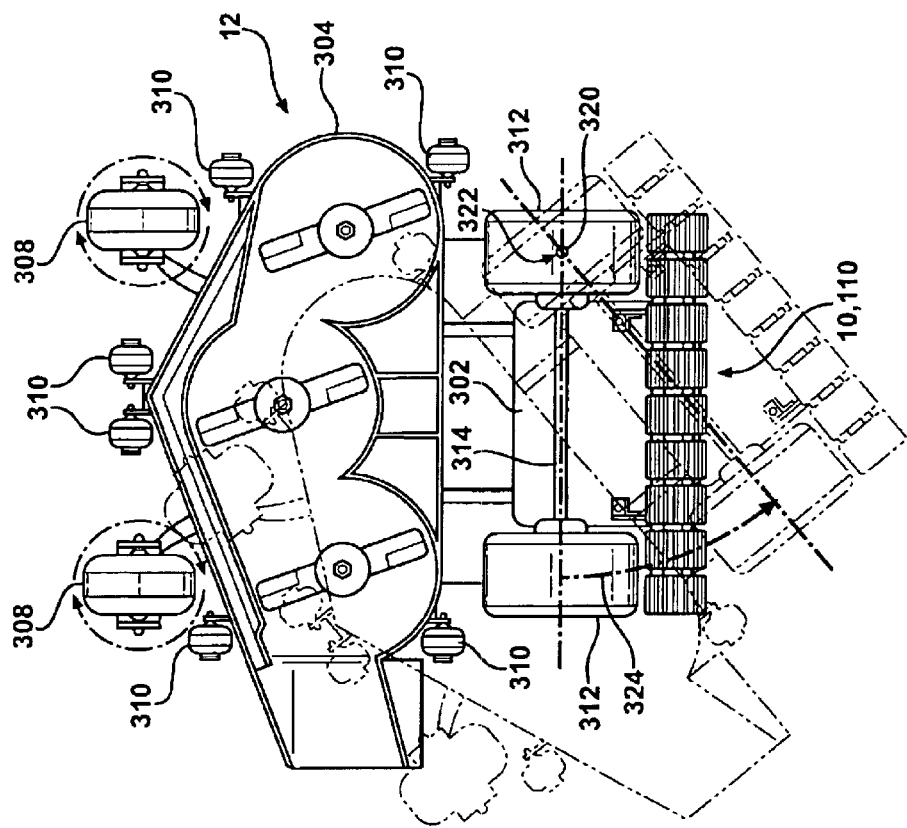
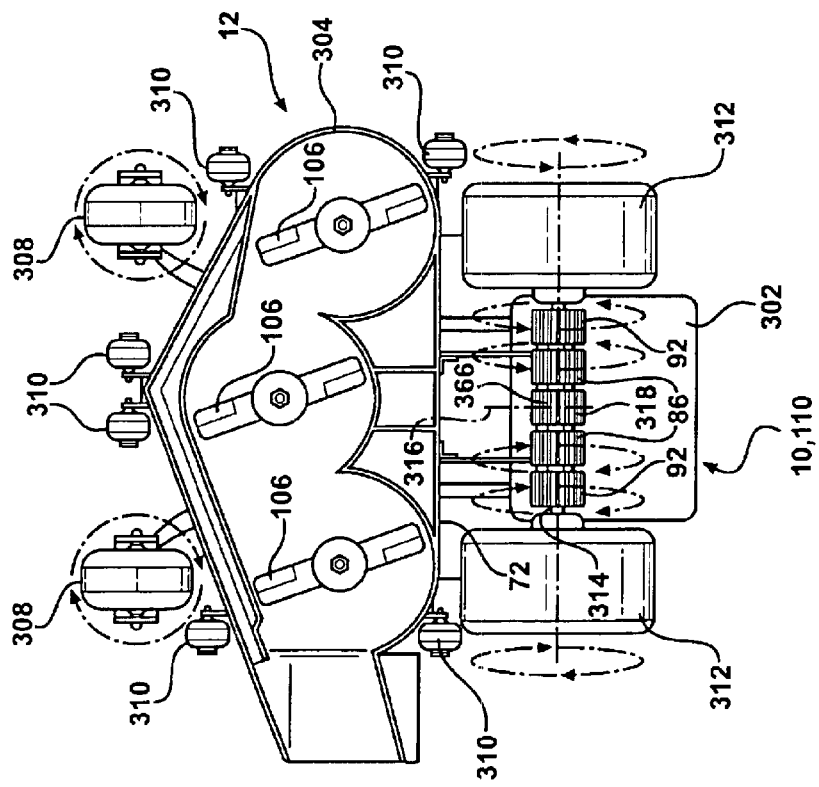

US 6,962,039 B2

LAWN STRIPING ASSEMBLY

CROSS-REFERENCE TO RELATED APPLICATIONS

This application is a continuation-in-part of application Ser. No. 10/385,093 filed Mar. 10, 2003, now abandoned on May 12, 2004, but which, in turn, claims the benefit of U.S. Provisional Patent Application Ser. No. 60/363,120, filed Mar. 11, 2002.

FIELD OF THE INVENTION

The subject invention generally relates to lawn care equipment and, more particularly, to lawn care equipment for bending grass.

BACKGROUND OF THE INVENTION

In the area of lawn and playing field maintenance, grass striping is a common practice, generally used in combination with cutting grass, whereby the grass on a lawn or field is bent in a particular direction causing light to be reflected therefrom in order to achieve an aesthetically pleasing appearance.

Typically, grass striping is accomplished through the use of rollers. Such rollers are fixedly attached on a commercial lawn mower having front and rear tires and a mower deck having a mower blade rotatably disposed therein. Conventionally, the rollers are disposed rearward of the mower deck and forward of the rear tires such that, after the grass is cut by the blade, the remaining grass is immediately bent in a particular direction. After the blade cuts the grass, the roller bends the grass in the same direction that the roller is moving. With each pass along the lawn or field, the roller stripes the grass in a band having a width equal to that of the roller. Generally, both commercial and residential mowers lack the space required to include a roller between the mower deck and the rear tires.

Various commercial and residential mowers incorporate a turning feature or a zero-turning radius, whereby, upon turning, the inner tire on the inside of the turn radius rotates backward while the outer tire on the outside of the turning radius rotates forward. Upon turning, the roller fixedly disposed between the mower deck and the rear tires is forced to travel in a direction perpendicular to its axis of rotation. As a result, the roller becomes wedged in the grass, thereby inhibiting the mower from preventing the turn.

In addition, such rollers are typically mounted to the mower in a static position above the ground in order to provide ground clearance and accommodate the contours of the lawn or field being mowed. Consequently, the rollers do not sit directly on the grass and the resultant bend imparted thereto is minimized.

Moreover, conventional rollers are made from one-piece steel rollers which are specially manufactured to the size requirements of the particular mower, thereby increasing the time and cost for manufacturing and repair which is passed on to consumers.

SUMMARY OF THE INVENTION AND ADVANTAGES

The subject invention is a lawn striping assembly for bending grass. The assembly includes a roller apparatus having a roller axis and a channel mechanism extending along a channel axis and including a top portion presenting a plurality of attachment positions. At least one support is included for supporting the roller apparatus on the channel mechanism with the roller axis being parallel to the channel axis.

In a more specific sense, the channel mechanism includes a channel member having a C-shaped cross section for retaining a fastener therein.

The assembly of the subject invention allows the roller assembly to be mounted at a wide variety of attachment positions on the lawn care device. Each part required to fabricate the assembly of the subject invention may be purchased off the shelf and in bulk, thereby reducing the time and costs for manufacture and repair, i.e., the invention relates to a new combination.

On a zero-turn radius lawn care device, the subject assembly may be disposed rearward of device or between the rear drive tires parallel with the wheel axis. Thus, the pivot point of the assembly mirrors the pivot point of the device. The assembly pivots with the drive tires which prevents the assembly from swinging perpendicular to the direction of the drive tires and scalping the grass. Further, the assembly is pivotally mounted to either the frame of the device or the mower deck. When pivotally mounted to the mower deck, a free-floating mower deck continues to float which also prevents scalping of the grass.

The assembly is pivotally mounted to the frame or the mower deck and, thus, rides on the ground at all times independently of the height of the mower deck or frame. As a result, a maximum bend is imparted to the grass to enhance the colors of the patterns created. Moreover, the mower deck may be adjusted without adjusting the height of the assembly therewith.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a bottom view of the lawn striping assembly of the present invention disposed on a zero turn-radius riding mower;

FIG. 5 is a bottom view of the lawn striping assembly of the present invention disposed on a zero turn-radius walk-behind mower.

DETAILED DESCRIPTION OF THE PREFERRED EMBODIMENT

Figure 1:
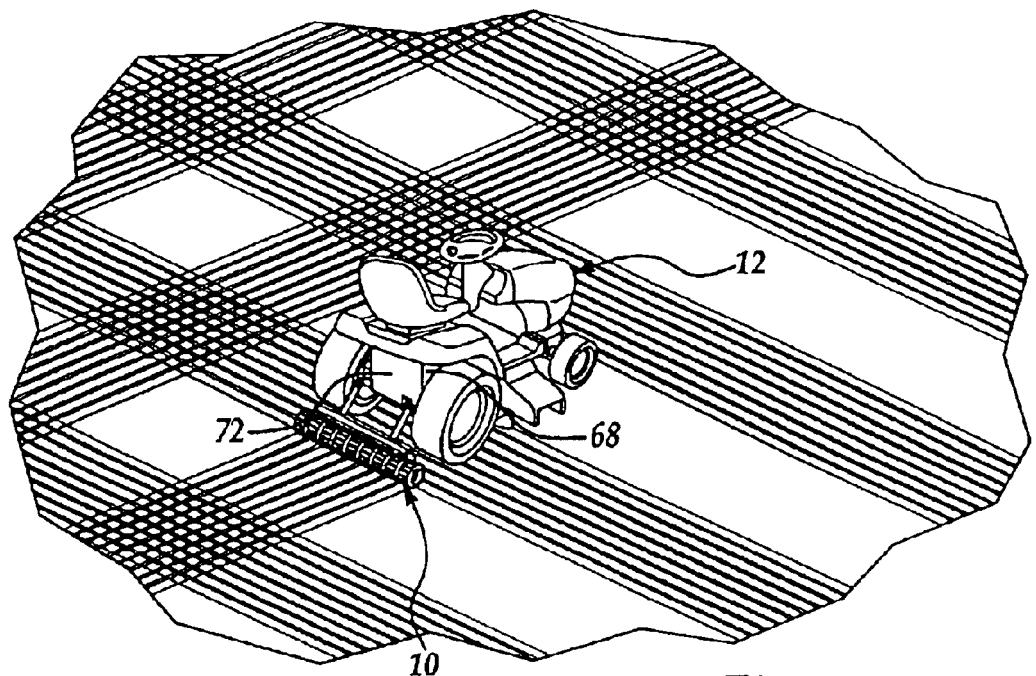
FIG. 1 is a perspective view of the lawn striping assembly of the present invention disposed on a lawn care device.
Figure 2:
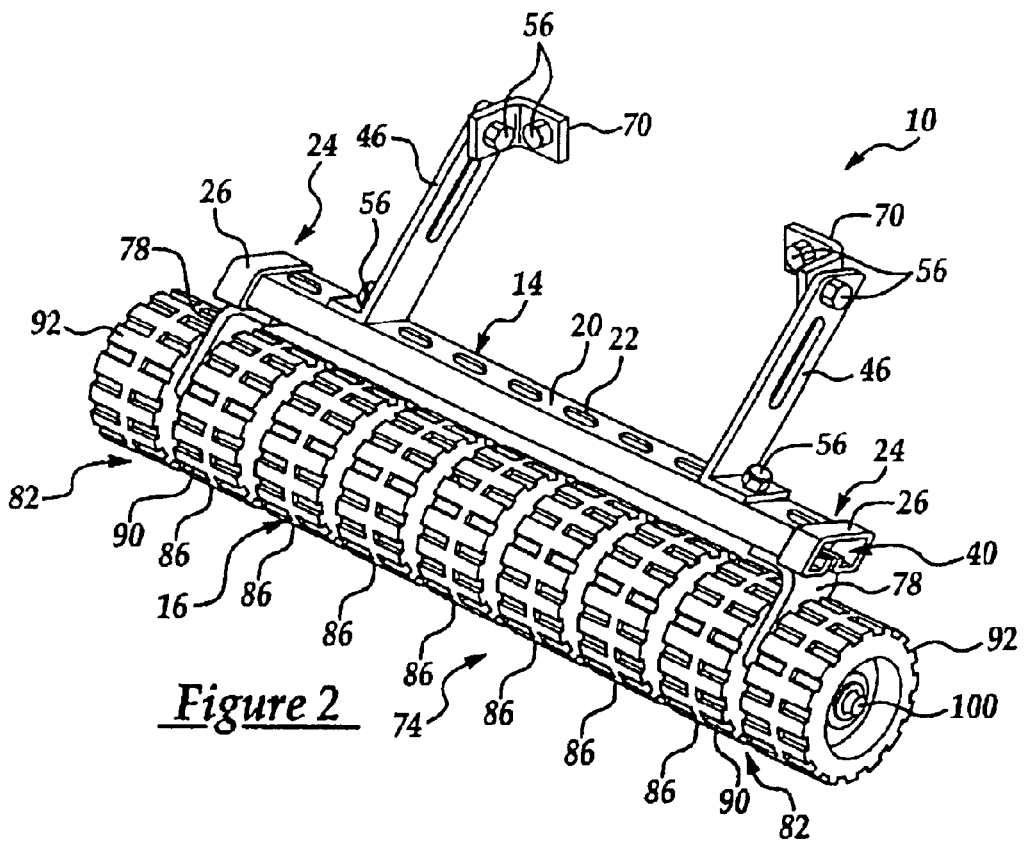
FIG. 2 is a perspective view of the lawn striping assembly of the present invention.
Figure 3:
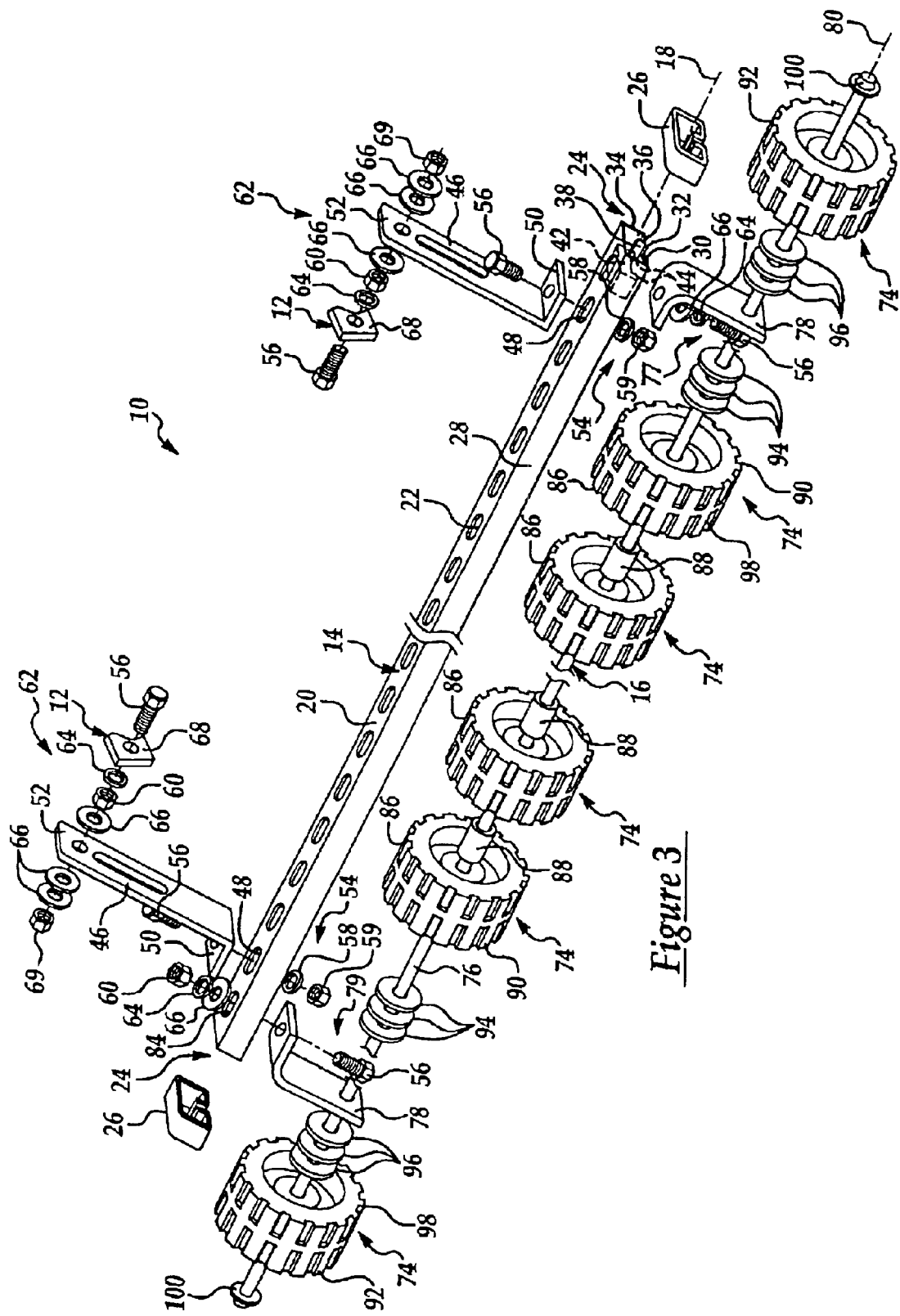
FIG. 3 is an exploded perspective view of the lawn striping assembly of the present invention.
Figure 6:
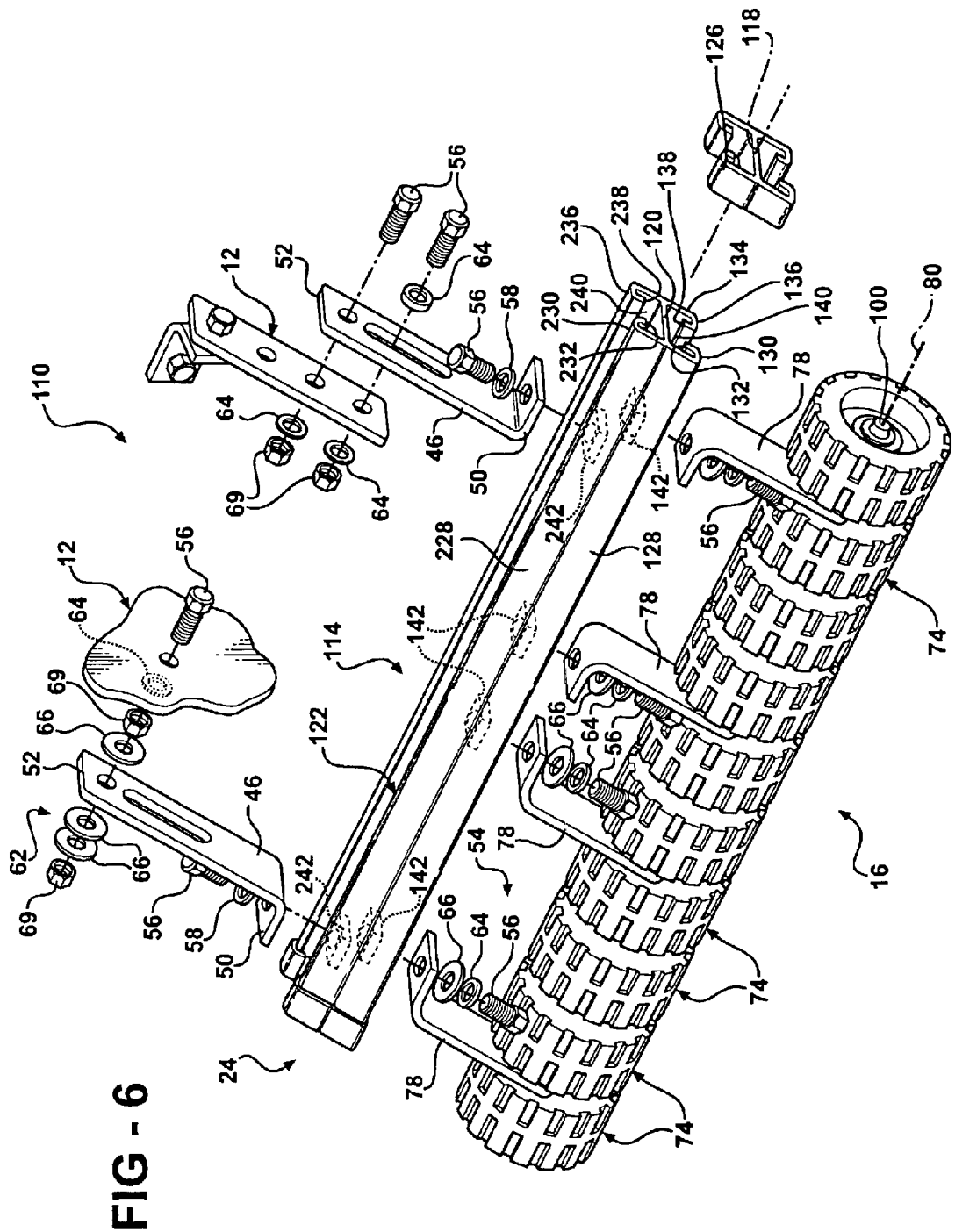
FIG. 6 is an exploded perspective view of the lawn striping assembly of the present invention.

Referring to the Figures, wherein like numerals differing by one hundred indicate like or corresponding parts throughout the several views, a lawn striping assembly for bending grass is generally shown at 10 in FIGS. 1–5 and at 110 in FIG. 6. The lawn striping assembly is disposed on a lawn care device, e.g., lawn mower, generally indicated at 12.

The lawn striping assembly 10, 110 includes a channel mechanism, generally shown at 14, 114 and a roller apparatus, generally shown at 16. The channel mechanism 14, 114 extends along a first or channel axis 18, 118 and includes a top portion 20, 120 having or presenting a plurality of attachment points or positions, defined by holes 22 in FIGS. 1–5 and by an upper channel member, as described hereinafter. The channel mechanism 14, 114 has opposing ends, generally indicated at 24, defined by at least one C-shaped channel member with an end cap 26, 126 disposed on each of the opposing ends 24.

A first side wall 28, 128 extends from the top portion 20, 120 and defines a first shoulder 30, 130 having a first lip 32, 132. A second side wall 34, 134 extends from the top portion 20, 120 and defines a second shoulder 36, 136 having a second lip 38, 138. The top portion 20, 120 and first and second side walls 28, 128 and 34, 134 define a channel passageway, generally indicated at 40, 140. In other words, the side walls 28, 128, 34, 134 are generally parallel to one another and are coextensive with the shoulders 30, 130, 36, 136 extending toward one another to define a slot therebetween that opens into the channel passageway 40, 140. A pair of fasteners 42, 142 are slideably disposed on the channel mechanism 14 in the channel passageway 40, 140. Each fastener 42 can include a pair of grooves 44 corresponding to each of the first 32, 132 and second lips 38, 138.

The assembly 10, 110 of the present invention further includes a pair of brackets 46 for attaching the channel members to a lawn care device 12, e.g., to a first pair of attachment positions defined by the holes 48 in FIGS. 1–5 and to an upper channel member in FIG. 6. Each bracket 46 includes a first end 50 and a second end 52 wherein the first end 50 is fixedly attached to the first pair of attachment positions on the channel mechanism 14 via a first connector, generally shown at 54 in FIGS. 3 and 6. In the first embodiment shown in FIG. 3, the first connector 54 includes a bolt 56, a washer 58, such as a split lock washer or any other suitable washer, and an oversized nut 59. The oversized nut 59 is a nut that, when tightened to the bolt, is disposed between the side walls 28, 34 which prevent the nut 59 from turning and backing off of the bolt 56. However, any suitable connector may be used to fixedly attach each of the brackets 46 to the channel mechanism 14, such as a square fastener 42.

The second end 52 of each bracket 46 is pivotally mounted on the lawn care device 12 via a rotatable fastener, generally shown at 62. In one arrangement, the rotatable fastener 62 includes the bolt 56, a split lock washer 64, a nut 60, a jam nut 69, and a plurality of flat washers 66. Although any suitable rotatable fastener may be used to pivotally mount the second end 52 of each bracket 46 to the lawn care device 12. In one arrangement, the pair of brackets 46 are pivotally mounted on a pair of side edges 68 of the lawn care device 12. In yet another arrangement shown at the right in FIG. 6, the bracket 46 is not rotatable and is connected by two bolts 56 the lawn care device 12. In addition, an adapter 70, such as an L-shaped bracket, may be pivotally attached to the second end 52 of each bracket 46 via the rotatable fastener 62. The adapter 70 is also fixedly attached to a front edge 72 of the lawn care device 12.

The roller apparatus 16 includes a plurality of rollers, each generally indicated at 74, that are identical, an axle 76, and a pair of axle supports 78 disposed on and support the axle 76. The axle 76 extends along a second or roller axis 80 that is parallel to the first axis 18 of the channel mechanism 14. The plurality of rollers 74 are disposed on the axle 76 in axial alignment.

The axle supports 78 are disposed on and support the axle 76 and are juxtaposed between two of the rollers 74, generally indicated at 82. The roller apparatus 16 is attached to the channel mechanism 14 via at least one pair of axle supports 78. In one arrangement, the pair of axle supports 78 are each attached via a second connector 77 to the pair of fasteners or square nuts 42, 142 slidably disposed in the channel passageway 40, 140 of the channel mechanism 14, 114. The second connector 77 includes the bolt 56, the lock washer 64, and the flat washer 66. In this arrangement, the axle supports 78 are adjustable along the axle 76 by merely sliding the fasteners 42, 142 through the channel passageway 40, 140, and, thus, may be easily moved to any desired location along the channel mechanism 14, 114 by changing the number of rollers 74 disposed on the axle 76 as required by a particular application.

In an alternate arrangement, the pair of axle supports 78 disposed on the axle 76 are each fixedly attached via a support connector 79 to a second pair of attachment holes 84 disposed on the channel mechanism 14. The support connector 79 includes a bolt 56, the lock washer 64, the flat washer 66 and the nut 60. In this arrangement, any adjustment of the axle supports 78 requires the connectors 54 to be loosened, the axle support 78 relocated along the axle 76, and the connector 54 tightened once again.

In applications where increased support is necessary, additional axle supports 78 may be disposed on the axle 76 and attached to a corresponding additional fastener 42, 142 slidably disposed in the channel mechanism 14, 114. Alternatively, the additional axle support 78 may be attached directly to an additional one of the attachment holes 22.

The width of the roller assembly 16 varies according to the lawn care device 12 for which it is designed. As shown in the Figures, one or more inner rollers 86 are axially aligned side-by-side on the axle 76 between the axle supports 78. A separator 88 is located between each inner roller 86 to reduce friction and lessen the wear and tear on the inner rollers 86.

The pair of axle supports 78 are located on the axle 76 outwardly of the outermost pair 90 of inner rollers 86. One or more outer rollers 92 are located outwardly from the axle supports 78. A first spacer 94 is disposed between each axle support 78 and the corresponding outermost inner roller 90. The first spacer 94 may include a plurality of washers or any other suitable spacer. A second spacer 96 is disposed between each of the axle supports 78 and the innermost outer roller 98. The second spacer 96 may include a plurality of washers or any other suitable spacer. The first and second spacers 94, 96 reduce friction and lessen wear and tear on the axle supports 78 and rollers 90, 98. A pair of axle caps 100 are mounted on opposing ends of the axle 76 to retain the rollers 74, axle supports 78, washers 94, 96, and separators 88 on the axle 76.

The embodiment of FIG. 6 includes a roller apparatus 16 having a roller axis 80 and a channel mechanism 114 extending along a channel axis 118 including a top portion 120 presenting a plurality of attachment positions, generally indicated at 122. More specifically, the embodiment of FIG. 6 presents an infinite number of attachment positions 122. Like the aforesaid embodiment, a plurality of supports 78 supporting the roller apparatus 16 on the channel mechanism 114 with the roller axis 80 being parallel to the channel axis 118.

Also like the first embodiment, the channel mechanism 114 includes a channel member having a first side wall 128 extending from the top portion 120 to a first shoulder 130 and a second side wall 134 extending from the top portion 120 to a second shoulder 136. The side walls 128, 134 are generally parallel and coextensive and the shoulders 130, 136 extend toward and are spaced from one another to define a slot therebetween that opens into a channel passageway 140. A square fastener 142 is disposed in the channel passageway 140 for attaching the support 78 to the channel member. Although not necessary, a first lip 132 extends from the first shoulder 130 toward the top portion 120 and a second lip 138 extends from the second shoulder 136 toward the top portion 120. The fastener 142 is disposed on and clamps the lips 132, 138. Again not necessary but the fasteners 142 may include a pair of grooves 44 corresponding to the first 132 and second 138 lips to position the square nuts 142 between the lips 132 and 138.

A plurality of the supports 78 support the axle 76 and are attached to a pair of the fasteners 142. In a similar fashion, a plurality of brackets 46 are attached to respective ones of said attachment positions axially along said top portion 120 for attaching the assembly to any one of various different lawn care devices. Unlike the embodiment of FIGS. 1–5, wherein the attachment positions 22 are defined by a plurality of holes disposed axially along said top portion 20 of said channel member, the embodiment of FIG. 6 the attachment positions 122 are defined by a second or top channel member defining an upper channel passageway 140 and a square nut fastener 242 disposed therein for attachment to the brackets 46. The upper and lower channel members are mirror images of one another. Although the upper and lower channel members may be identical and separate in back to back relationship, they are shown as integral with one another along the top portions 120 thereof.

The invention provides a lawn striping assembly for bending grass that utilizes a channel member having a C-shaped cross section for retaining a fastener therein. In a more specific sense, the invention utilizes a pair of said C-shaped channel members disposed in back to back relationship with one another, as shown in FIG. 6. A first fastener 142 is retained in one of the channel members (the lower one) for supporting the support 78 and a second fastener 242 is disposed in the other channel member (the upper one) for connecting the bracket 46 to the other channel member.

The lawn striping assembly 10, 110 of the subject invention is mounted to the lawn care device 12. More particularly, the lawn care device 12 includes a frame 302 and a mower deck 304 having a mower blade 306 disposed therein, such as a walk-behind lawn care device, a riding lawn care device, a zero turn-radius lawn care device or any other suitable lawn care device.

Referring to FIGS. 4 and 5, a zero turn-radius ("ZTR") lawn care device 12 includes a pair of front drive tires 308 disposed on the frame 302, a plurality of mower deck wheels 310 attached to the mower deck 304, and a pair of rear drive tires 312 interconnected via a wheel axle 314. The ZTR riding lawn care device 12 is capable of pivoting about a first central turn axis 316.

Referring to FIG. 4, the first central turn axis 316 of a ZTR riding lawn care device 12 is located at or near the center point between the pair of rear drive tires 312. The ZTR riding lawn care device 12 pivots about the first central turn axis 316 by turning one rear drive tire 312 in the forward direction and turning the other rear drive tire 312 in the reverse direction.

The lawn striping assembly 10 of the subject invention is disposed between the rear drive tires 312 and parallel with the wheel axle 314 of the ZTR riding lawn care device 12. In operation, as the rear drive tires 312 of ZTR riding lawn care device 12 roll about the first central turn axis 316, the lawn striping assembly 10 pivots in conjunction therewith. More specifically, the outer 92 and inner rollers 86 closest to the forward moving rear drive tire 312 roll forward. The outer 92 and inner rollers 86 closest to the rearward moving rear drive tire 312 roll rearward. The center roller 318 at the center of the axle 76 and in alignment with the first central turn axis 316 does not roll or rolls only slightly because it has the same central turn axis as the ZTR riding lawn care device 12 and serves as the pivot point for the lawn striping assembly 10.

Referring to FIG. 5, a second central turn axis 320 of a ZTR walk-behind lawn care device 12 is located at or near a center point, generally shown at 322, of one of the rear drive tires 312 and, more particularly, the rear drive tire 312 which is located on the inside of the turn. More specifically, the ZTR walk-behind lawn care device 12 pivots about the second central turn axis 320 when the brake is applied to one of the rear drive tires 312. The rear drive tire 312 to which the brake is applied locks in place and becomes the pivot point on the inside of the turn.

The lawn striping assembly 10 of the subject invention is disposed behind the rear drive tires 312 and parallel with the wheel axle 314. In operation, as the outside rear drive tire 312 pivots around the second central turn axis 320 of the static rear drive tire 312 and forms an arc 324 thereabout, the lawn striping assembly 10 pivots accordingly. More specifically, the outer rollers 92 of the lawn striping assembly 10 which are positioned behind the static rear drive tire 312 are also static or roll only slightly and serve as the pivot point of the assembly 10. The outer rollers 92 positioned behind the outside rear drive tire 312 and the inner rollers 86 roll about the static rollers 92 and follow the arc 324 about the lawn striping assembly 10 pivot point.

The invention has been described in an illustrative manner, and it is to be understood that the terminology that has been used is intended to be in the nature of words of description rather than limitation. It is recognized that those skilled in the art may make various modifications or additions to the preferred embodiments chosen herein to illustrate the present invention, without departing from the spirit of the present invention. Accordingly, it is to be understood that the subject matter sought to be afforded protection should be deemed to extend to the subject matter defined in the appended claims, including all equivalents thereof.

What is claimed is:

1. A lawn striping assembly for bending grass, comprising:
   a roller apparatus (16) having a roller axis (80);
   a channel mechanism (14, 114) extending along a channel axis (18, 118) and including a top portion (20, 120) presenting a plurality of attachment positions (22, 122);
   at least one support (78) attached at one of the attachment position (22, 122) for supporting said roller apparatus (16) on said channel mechanism (14, 114) with said roller axis (80) being parallel to said channel axis (18, 118).

2. An assembly as set forth in claim 1 including a plurality of said supports (78).

3. An assembly as set forth in claim 1 wherein said channel mechanism (14, 114) includes at least one channel member having a first side wall (28, 128) extending from said top portion (20, 120) and defining a first shoulder (30, 130) and a second side wall (34, 134) extending from said top portion (20, 120) and defining a second shoulder (36, 136).

4. An assembly as set forth in claim 3 wherein said side walls (28, 128), (34, 134) are generally parallel and coextensive and said shoulders (30, 130), (36, 136) extend toward and are spaced from one another to define a slot therebetween that opens into a channel passageway (40, 140).

5. An assembly as set forth in claim 4 including a fastener (42, 142) disposed in said channel passageway (40, 140) for attaching said support (78) to said channel member.

6. An assembly as set forth in claim 5 including a first lip (32, 132) extending from said first shoulder (30, 130) toward said top portion (20, 120) and a second lip (38, 138) extending from said second shoulder (36, 136) toward said top portion (20, 120), said fastener (42, 142) being disposed on said lips (32, 132), (38, 138).

7. An assembly as set forth in claim 6 wherein said fastener includes a pair of grooves (44) corresponding to said first (32, 132) and second (38, 138) lips.

8. An assembly as set forth in claim 5 wherein said roller apparatus includes an axle (76) and a plurality of rollers (74) rotatably supported on said axle (76), a plurality of said supports (78) supporting said axle (76) and being attached to a pair of said fasteners (42, 142).

9. An assembly as set forth in claim 5 including a plurality of brackets (46) for attachment to respective ones of said attachment positions axially along said top portion (20, 120) for attaching said assembly to any one of various different mower structures.

10. An assembly as set forth in claim 9 wherein said attachment positions (22) are defined by a plurality of holes disposed axially along said top portion (20) of said channel member for attachment to said brackets (46).

11. An assembly as set forth in claim 9 wherein said attachment positions (122) are defined by a second channel member defining a channel passageway (140) and a fastener (242) disposed therein for attachment to said brackets (46).

12. An assembly as set forth in claim 11 wherein said channel members are mirror images of one another.

13. An assembly as set forth in claim 12 wherein said channel members are integral with one another along the top portions (120) thereof.

14. An assembly as set forth in claim 1 wherein said attachment positions (22) are defined by a plurality of holes disposed axially along said top portion (20) of said channel member for attachment to a plurality of brackets (46).

15. An assembly as set forth in claim 1 wherein said attachment positions (122) are defined by a channel member defining a channel passageway (140) and a fastener (242) disposed therein for attachment to a plurality of brackets (46).

16. A lawn striping assembly as set forth in claim 9 combined with a lawn care device (12), said brackets (46) being connected to said lawn care device (12).

17. An assembly as set forth in claim 16 wherein each bracket (46) includes a first end (50) and a second end (52), wherein said first end (50) is fixedly attached to said channel mechanism (14, 114) and said second end (52) is pivotally mounted on the lawn care device (12).

18. An assembly as set forth in claim 17 wherein the lawn care device (12) includes a frame (302) and a mower deck (304).

19. An assembly as set forth in claim 18 wherein said lawn care device (12) is a zero-turn radius riding lawn care device having a pair of rear drive tires (312).

20. An assembly as set forth in claim 19 wherein said assembly is disposed between said pair of rear drive tires (312).

21. An assembly as set forth in claim 20 wherein said assembly is pivotally mounted on said frame (302) via said pair of brackets (46).

22. An assembly as set forth in claim 21 wherein said lawn care device (12) is a zero-turn radius lawn care device.

23. An assembly as set forth in claim 21 wherein said lawn care device (12) is a walk-behind lawn care device.

24. An assembly as set forth in claim 21 wherein said lawn care device (12) is a riding lawn care device.

* * * * *